UNITED STATES PATENT OFFICE.

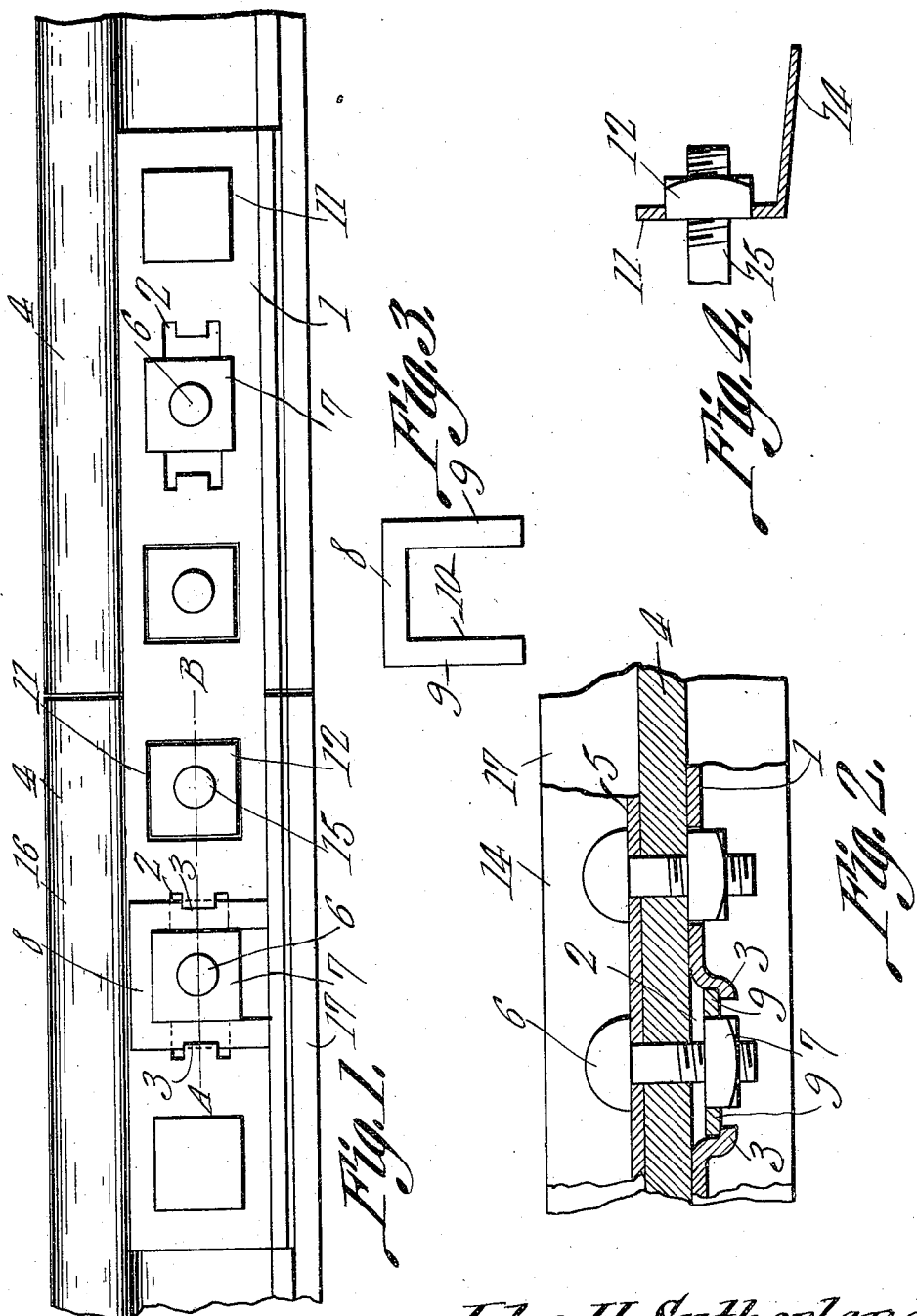

JOHN H. SUTHERLAND, OF DANVILLE, ILLINOIS.

NUT-LOCK.

975,177.  Specification of Letters Patent.  Patented Nov. 8, 1910.

Application filed August 1, 1910. Serial No. 574,881.

*To all whom it may concern:*

Be it known that I, JOHN H. SUTHERLAND, a citizen of the United States, residing at Danville, in the county of Vermilion and State of Illinois, have invented a new and useful Nut-Lock, of which the following is a specification.

It is the object of this invention to provide a nut lock which will hold a plurality of nuts against rotation, and so to construct the nut lock that the same may readily be placed in operative position and removed, when the occasion for its use has passed.

In the drawings,—Figure 1 shows the invention in side elevation applied to a railroad rail; Fig. 2 is a section upon the line A—B of Fig. 1; Fig. 3 is a front elevation of the locking plate; and Fig. 4 is a sectional detail, illustrating a modified form of the invention.

The invention includes, as a primary and fundamental element, a plate 1, in which are one or more openings 2, elongated in the direction of the longer dimension of the plate. At the ends of these openings 2, are tongues 3, extended longitudinally of the plate, toward each other, and preferably formed integrally with the plate. These tongues are, as seen most clearly in Fig. 2, bent outwardly, so as to be spaced from the outer face of the plate 1.

The plate 1 may be of any desired outline, depending upon the use to which the plate is to be put. In the present instance, the plate is shown and employed upon a pair of abutting railroad rails 4, and therefore, the plate has been shown as being straight, although this construction may obviously be departed from.

In employing the device, a fish plate 5 may, if desired, be applied to one face of the railroad rail or other structure. A plurality of bolts 6 and 15 are extended through this fish plate 5 and through the rails 4. Nuts 12 are mounted upon the bolts 15, and rotated to a firm seat. The nuts 7 which are carried by the bolts 6 are not yet applied to the bolts. After the nuts 12 have been mounted upon the bolts 15, the plate 1 is applied to the structure through which the bolts 6 and 15 are extended, the nuts 12 registering closely, and against rotation in polygonal openings 11, conforming to the peripheral outline of the nuts 12.

The invention further includes a bifurcated locking plate 8, the legs 9 of which are adapted to fit between the tongues 3 and the body of the plate 1, to engage closely, and against rotation, the nuts 7 which have previously been rotated to a seat upon the bolts 6. It will be seen that the nuts 12 cannot rotate in the openings 11, the nuts 7 being restrained against rotation by contact with the legs 9 of the locking plate 8, the locking plate 8 obviously being held in place by the tongues 3. If desired, the locking plate 8 may be of such dimensions that its upper edge will abut against the ball 16 of the rail, the lower edge of the locking plate abutting against the flange 17 of the rail. In this connection it may properly be stated that when the locking plate 8 is employed upon a railroad rail, the locking plate is preferably fashioned from flexible, or resilient material, so that the locking plate may properly be seated between the ball 16 and the flange 17. When thus disposed, it will be seen that the inner edges 10 of the legs 9 of the locking plate, will engage the nut 7 and hold the same against rotation. If desired, the locking plate may be modified to the extent indicated in Fig. 4. In such instance, the plate 1 is provided with an inclined flange 14 along its lower edge, adapted to rest upon the upper face of the flange 17 of the rail.

It is to be noted, as is clearly seen in Fig. 2, that the elongated openings 2 in the plate 1 extend entirely across the legs 9 of the locking plate 8, when the same is mounted in position to hold the nut 7 against rotation. By reason of this construction, the legs 9 of the locking plate 8 may be dished slightly into the openings 2, to separate the locking plate 8 from the nut 7 and the tongue 3, should these parts be rusted together, or be otherwise closely bound. Moreover, by reason of the fact that the legs 9 can be dished rearwardly into the opening 2, a cold chisel, or other edged tool may be inserted beneath the tongues 3, to pry the tongues open, slightly, thus permitting the locking plate 8 to be freely withdrawn.

It is to be understood that the drawings show typical embodiments merely, and that many changes, properly falling within the scope of what is claimed, may be made without departing from the spirit of the invention.

Having thus described the invention what is claimed is:—

A nut lock including a plate having an elongated opening for the reception of a bolt, there being tongues in the plate at the ends of said opening; and a bifurcated locking member adapted to be inserted between the tongues and the body of the plate, to straddle the nut upon the bolt, and to engage said nut closely, the opening in the plate being extended entirely across the arms of the locking member.

In testimony that I claim the foregoing as my own, I have hereto affixed my signature in the presence of two witnesses.

JOHN H. SUTHERLAND.

Witnesses:
H. A. INGERSOLL,
H. F. ESPENSCHEID.